Dec. 6, 1938. L. F. POOCK ET AL 2,139,282
GAUGING DEVICE
Filed Jan. 6, 1937 3 Sheets—Sheet 1
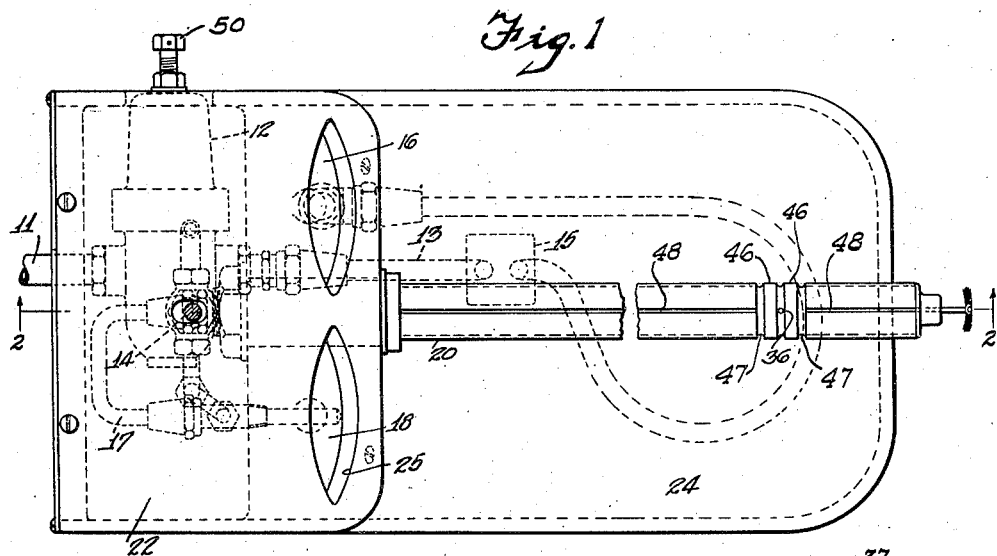
Fig. 1
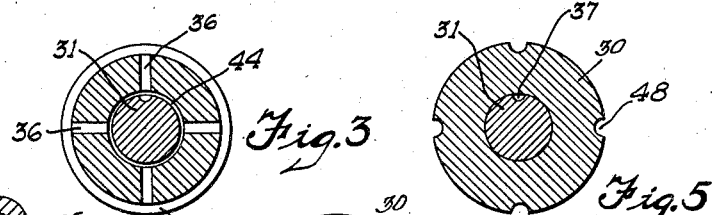
Fig. 3
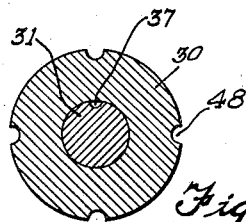
Fig. 5
Fig. 4
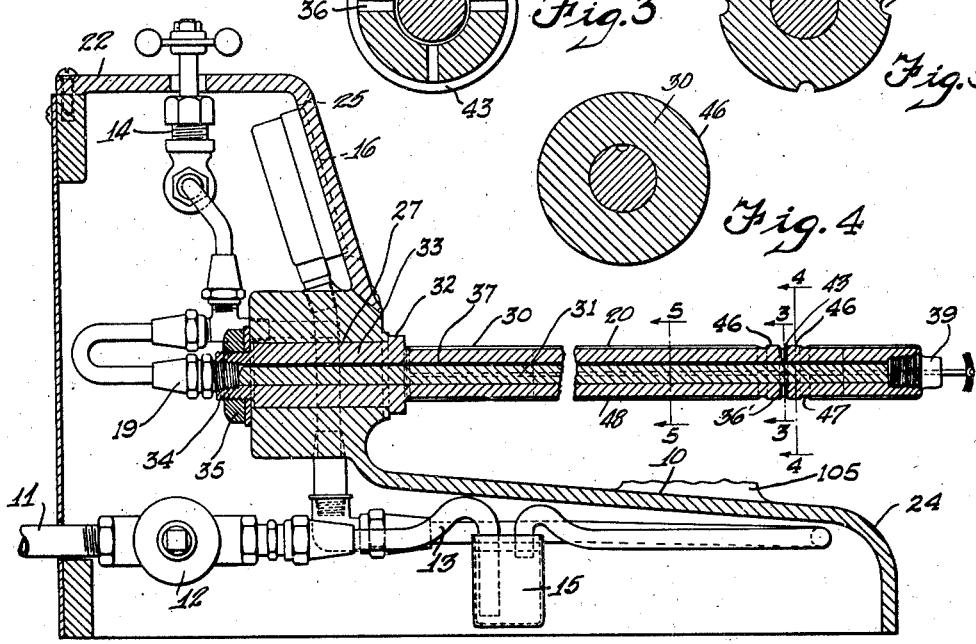
Fig. 2
INVENTOR
Louis F. Poock &
Wallis Fay Aller
BY
Maréchal & Noe
ATTORNEY Dec. 6, 1938. L. F. POOCK ET AL 2,139,282
GAUGING DEVICE
Filed Jan. 6, 1937 3 Sheets-Sheet 2

INVENTOR
Louis F. Poock &
Wallis Fay Aller
BY
Marechal & Noe
ATTORNEY

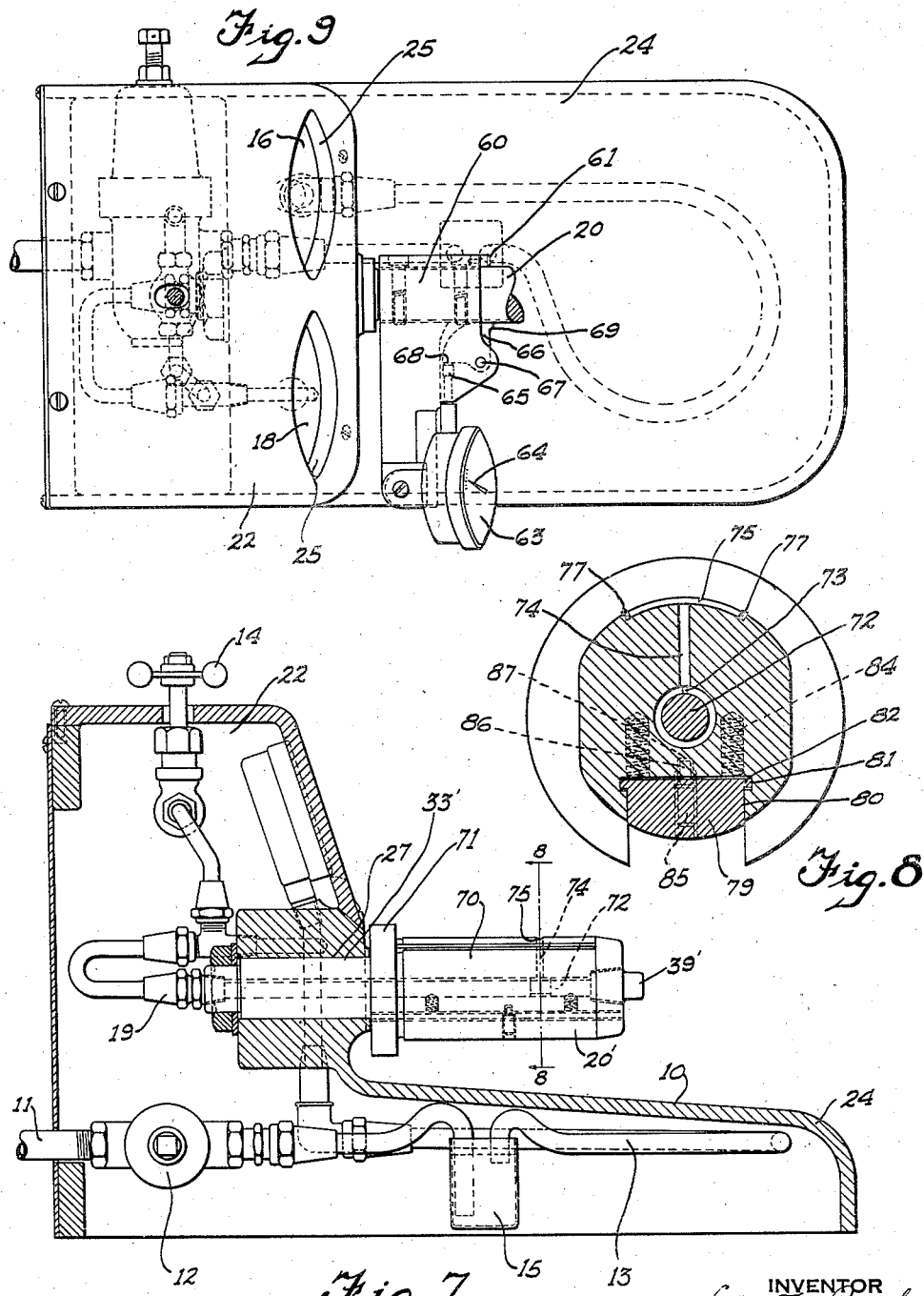

Patented Dec. 6, 1938

2,139,282

UNITED STATES PATENT OFFICE 2,139,282

GAUGING DEVICE

Louis F. Poock and Willis Fay Aller, Dayton, Ohio, assignors to The Sheffield Gage Corporation, Dayton, Ohio, a corporation of Ohio Application January 6, 1937, Serial No. 119,293

4 Claims. (Cl. 33—178)

This invention relates to gauging devices.

One of the principal objects of the invention is the provision of a gauging device utilizing fluid having a pressure differing substantially from atmospheric pressure as a gauging medium and as a means of indicating deviation of a work piece from an accepted size standard by measure of fluid leakage between the work piece and a gauging element with which the work piece interfits during the gauging operation.

Another object of the invention is the provision of such a gauging device that is readily adjustable to a desired degree of sensitivity.

Another object of the invention is the provision of such a gauging device having readily replaceable gauging elements to afford a wide range of gauging operations, and readily adjustable fluid flow controlling devices for coordinating the flow conditions to the particular gauging operation to be performed.

A further object of the invention is the provision of a gauging element that measures size variation in terms of fluid leakage and comprises a sensitivity determining flow passage arranged as an elongated groove on one of the engaging faces of a pair of telescopically interfitting members of which one member interfits the piece to be gauged.

Still another object of the invention is the provision of a gauging element for cooperation with the cylindrical surface of a work piece to concomitantly gauge the straightness of the work piece surface as well as its deviation from a predetermined diameter.

Another object of the invention is the provision of a gauging device utilizing fluid having a pressure differing from atmospheric pressure as a gauging medium and functioning by a measure of fluid leakage to indicate an out of round condition in a cylindrical surface.

Other objects and advantages of the invention will be apparent from the following description, the accompanying drawings and the appended claims.

In the drawings, in which is disclosed preferred embodiments of the invention,—

Fig. 1 is a plan view of one form of the gauging device;

Fig. 2 is a vertical sectional view taken on the line 2—2 of Fig. 1;

Fig. 3 is a transverse sectional view as indicated by the line 3—3 on Fig. 2;

Fig. 4 is a transverse sectional view as indicated by the line 4—4 on Fig. 2;

Fig. 5 is a transverse sectional view as indicated by the line 5—5 on Fig. 2;

Fig. 7 is a sectional view corresponding in positioning to Fig. 2 and illustrating a different form of the gauging device;

Fig. 8 is a transverse section as indicated by the line 8—8 on Fig. 7;

Fig. 9 is a plan view generally similar to Fig. 1 and illustrating a further modification of the gauging device;

Figure 6:
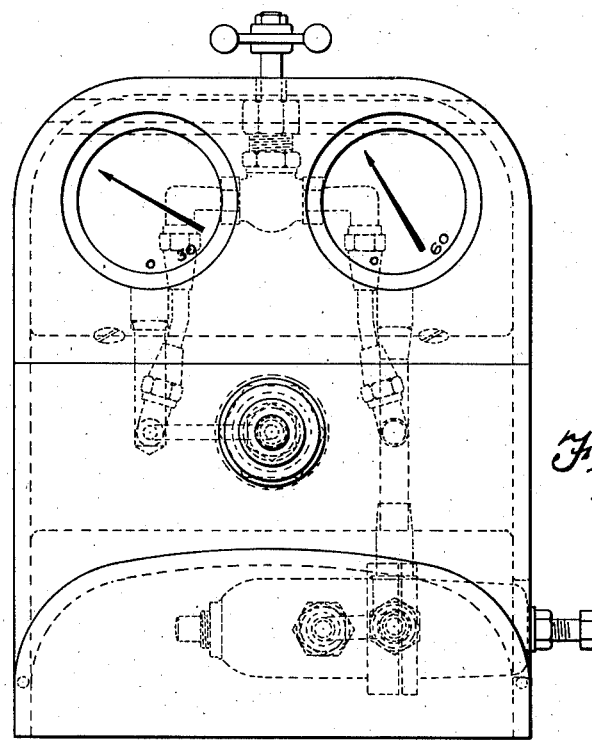
Fig. 6 is an end elevational view of the device shown in Figs. 1 and 2.
Figure 12:
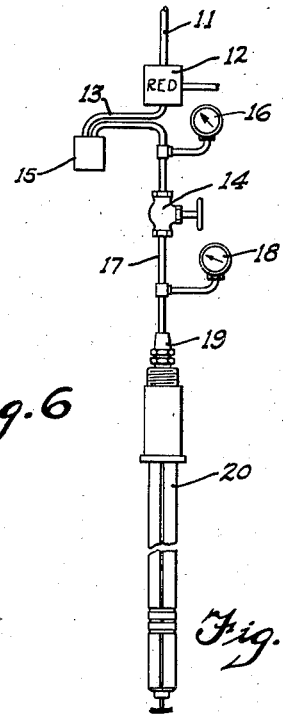
Fig. 12 is a diagrammatic showing of the fluid flow connections utilized in the gauging device.

The drawings, in which like characters of reference designate like parts throughout the several views thereof, show several modifications of a gauging device wherein fluid having a pressure differing from atmospheric pressure is utilized as a gauging medium. The gauging device incorporates a gauging element that is adapted to receive a work piece in interfitting engagement. The element has a fluid outlet of which the effective opening is varied by the fit of the work piece so that a reading may be taken of the work piece size in terms of fluid leakage. In the illustrated embodiments of the invention a single arrangement of fluid flow connections has been provided to which gauging elements of different character may be attached so that a wide range of gauging operations may be performed on the device.

Referring now in general terms to the gauging device, there is provided a framework or housing 10 which serves as an enclosure for the various fluid flow connections and as a supporting structure for the several parts of the device. The fluid flow connections, which are common for the several modifications illustrated, comprise an inlet pipe 11 which is adapted to be connected to a suitable source of fluid having a pressure differing from atmospheric pressure such, for example, as a factory air line in which the pressure is above atmospheric pressure. The pipe 11 has connection within the device to a reducing valve 12 whereby the line pressure may be controlled to provide a desired working pressure within the gauging device. A pipe 13 connects from the reducing valve to an additional control valve which is illustrated as a globe valve 14 and which affords further control for regulation of the air supply. The pipe 13, intermediate the reducing valve 12 and the globe valve 14, has connected therein a suitable filtering device 15 which serves to remove moisture and the other undesirable elements from the fluid flow, and has also connected thereto a pressure gauge 16. A pipe 17, which extends from the globe valve 14, has connected thereinto a pressure gauge 18 and terminates at a fitting 19 for attachment of a gauging element 20.

Referring now more particularly to Figs. 1 to 9, in the gauging device here illustrated the housing 10 comprises an enlarged rear portion 22 and a relatively shallow forwardly extending portion 24. The rear portion 22 serves to enclose the reducing valve 12, the globe valve 14, and the gauges 16 and 18; the latter being clearly visible at the front of the device through openings 25 provided in the forward face of the housing part 22. The relatively shallow forwardly extending base portion 24 accommodates the filter 15 and is of sufficient size to permit the use of a relatively long looped section of the pipe 13 whereby ready assembly of the parts is obtained. The gauging element 20, which assembles to the base or housing through provision of a receiving opening 27 in the forward face of the part 22, extends forwardly over the base portion 24 when assembled for use.

With the gauging element in assembled position the gauging operation is performed by interfitting a work piece to the gauging element, and by applying fluid pressure to the gauging element and measuring fluid leakage between the gauging element and the work piece as an indicating of deviation of the work piece from an accepted size standard. This performance obtains by constructing the gauging element with a fluid flow passage communicating with the pipe line of the gauging device and by terminating this flow passage at the face of the gauging element intermediate portions of the gauging element of predetermined size which closely receive a work piece. The gauging device is adjusted for used by applying to the gauging element a standard test piece of known size and by adjusting the pressure controls to afford a desired fluid pressure and leakage flow so that subsequent gauging operations upon work pieces of unknown size will permit a classification of such pieces by reference to the indicating gauges which show any deviation from the flow conditions existing with the standard test piece. Another method of operation involves two test pieces which have a size difference to represent the allowable limits of size variation in the work pieces to be tested. That is, one of the test pieces is of minimum size and under test will give a certain indication. The other is of maximum allowable size and defines the other limit of allowable indication. The work pieces to be acceptable must indicate between the limits.

The sensitivity of the gauging device may be varied by adjustment of the several control valves and may be additionally varied by a rearrangement of the parts constituting the gauging element. As shown particularly in Figs. 1 to 6, the gauging element comprises a sleeve-like member 30 of which the exterior surface is arranged to receive the work pieces in the measuring operation. The member 30 has an axially extending passage therethrough within which is received a bar 31 which cooperates with the sleeve 30 in determining the sensitivity of the gauging element. Toward the end of the sleeve 30 that is receivable within the housing part 22 is provided a shoulder 32 beyond which is a stem portion 33 of such size as to be closely and removably received within the opening 27 of the housing part 22. The stem 33 terminates in a threaded end 34 which is adapted to receive a nut 35 by which the gauging element may be securely positioned on the base. The end 34 is internally threaded to receive the connecting union 19 that completes the connection to the fluid supply line.

Air escape from the gauging element is through one or more passages 36 extending to the sleeve interior where communication obtains with the point of attachment of the supply line union 19 by provision of a groove in one of the cooperating faces of the interfitting sleeve 30 and bar 31. In the construction illustrated the bar 31 closely fits within the sleeve passage and has an axially extending groove 37 continuing for the full length thereof. The length of the inner rod 31 is such that it may be securely held within the sleeve 30 intermediate the fitting 19 at one end thereof and a closure plug 39 which is applied to the opposite end of the sleeve 30.

The provision of the grooved rod 31 greatly simplifies the problem of obtaining a properly proportioned elongated air passage of relatively small cross section within the gauging element. The restriction provided by the elongated air passage serves to prevent excessive loss of air pressure between gauging operations. It is a very simple matter to form a groove of the desired proportions in the surface of the bar 31, and it would be a very difficult task to drill a hole of similar proportions through the gauging element as would be necessary in a construction not employing the separate removable part. An additional advantage obtains in that a plurality of the removable rods 31 may be provided, each with a groove of different proportions, so that a desired change in the sensitivity of the gauging device may be made by the very simple act of replacing a bar 31.

The fluid escape passages 36 which communicate with the surface of the gauging element are shown as four equally spaced radially extending passages which lie in a transverse plane with respect to the gauging element axis and which terminate at their outer ends in alignment with an annular groove 43 on the face of the sleeve 30. Communication between the several passages 36 and the long passage afforded by the groove 37 in the rod 31 is provided by means of an annular groove 44 on the inner face of the sleeve 30 at the inner terminals of the several radial passages.

To afford an accurate determination of size relationship between the gauging element and a work piece the gauging sleeve 30, at each side of the annular air escape groove 43, has short axially extending portions 46 which are accurately formed to a true cylinder of predetermined size. The gauging faces 46 are preferably relatively short in axial extent and each terminates at an annular groove 47 which serves to define the extent of the gauging portion of the sleeve 30. Extending outwardly from the two grooves 47 are axially extending surface grooves 48 by which fluid leakage escaping across the faces 46 is conveyed beyond the extent of the telescoping work piece. As shown, the sleeve 30 is provided with four equally spaced grooves 48.

Any desired number of the gauging elements 20 of different size may be provided as interchangeable parts of the gauge structure by constructing the gauging elements with an interfitting stem portion 33 of common size so that they may be readily and replaceably attached to the housing. The sensitivity adjustment is simplified by establishing the axial passage in the gauging sleeves of common size so that the central rods 31 are interchangeable within the gauging sleeves thus necessitating but a single set of rods 36 for application to different sleeves 30 when it is desired to alter the cross sectional area of the flow passage 37. The rods 31 are easily interchanged by removal of an end plug 39.

To refer now to other sensitivity adjustments of the gauging device, it is pointed out that a desired line pressure may be provided by adjustment of the reducing valve 12 which, as shown, is provided with adjusting means 50. Pressure conditions within the line on the gauge side of the reducing valve are indicated on the gauge 16. Further control of the pressure and of the flow capacity of the gauging line is afforded by the globe valve 14 which may be adjusted as desired and which pressure is indicated on the gauge 18. Adjustment of the various valves is made after inserting a standard test piece on the gauging element so that a suitable air flow will obtain to permit fluid leakage between the gauging element and the standard piece at a desired pressure on the gauge 18. As the flow passage 37 is of material length, and as it functions somewhat in the manner of a reservoir, a variation in the cross sectional area of this passage serves as a means of altering the sensitivity of the gauging device. That is, a flow passage 37 of large cross sectional area may be desirable where the gauging operation is of such nature that a wide variation in leakage may obtain within the allowable limits of size variation from the accepted standard while a considerably smaller flow passage may be desirable under conditions where a narrow tolerance limit is necessary. Further modification of the reservoir action of the flow passages is obtained by variation of the globe valve.

It is thought that it will now be readily apparent that having adjusted the gauging device for a standard test piece to obtain fluid leakage of an amount such that a desired pressure is maintained on the gauge 18, the subsequent application of work pieces of unknown size will afford changes in fluid leakage such that different gauge indications obtain. It is believed that it is likewise apparent that having established readings on the gauging device through the use of standard test pieces having a diameter difference corresponding to the maximum and minimum tolerance limits, subsequent application of unknown work pieces will permit classification of those work pieces with respect to the established tolerance limits.

An additional function obtains in a gauging element of the character here under consideration, and wherein the element is constructed of material length in proportion to its diameter, in that any variation in diameter within the axial extent of a work piece is readily determined by moving the work piece across the gauging position for the full axial extent thereof. That is, the gauging element may be made quite long for use with work pieces of material length. Movement of the work piece over the gauging element for the full length thereof will afford an indication of any local deviation in the work piece from an acceptable size standard. In addition to giving an indication of diameter variation the gauging element, by being of material length and of a predetermined size, may function also as a means of indicating any axial curvature in a work piece.

The body of the gauging sleeve 30 may be accurately formed throughout its entire extent to a desired predetermined diameter. Those portions 46 which function to gauge by fluid leakage are permitted to remain without any surface grooves. The remaining portions of the sleeve may be slotted as shown to permit free escape of any fluid leakage beyond the gauging position. The slots are quite small so that peripherally the gauging sleeve is substantially fully cylindrical and, during a gauging operation, may function as a plug gauge to give an indication of straightness of a work piece.

In the illustration of Fig. 9 additional gauging means are incorporated to permit measurement of the work piece ends and to provide an indication of squareness of the work piece ends with respect to the axial bore thereof. As shown, the gauging element 20 is grasped adjacent the point of entrance within the housing by an encircling sleeve 60 which may be fixedly attached to the gaging sleeve 30 and which serves to support a gauge plug 61 that functions as a stop to limit telescoping movement of the work pieces. The sleeve 60 likewise carries a gauging device which, in the illustrated embodiment of the invention, is a dial indicator 63 having an indicating pointer 64 that moves in accordance with the travel of the indicator stem 65. Motion transmitting means provide an operating connection between the stem 65 and a work piece. Any deviation in the squareness of a work piece end will, upon rotation of the work piece in engagement with the fixed stop 61, cause movement of the motion transmitting means to thereby actuate the indicator 63. As shown, a bell crank 66 is pivotally carried on the sleeve 60 by provision of a pivot pin 67. One end of the bell crank, indicated at 68, engages the indicator stem 65. The other end of the member 66 is provided with a boss 69 that is adapted to contact the end of the work piece; the arrangement of the parts being such that the member 66 is urged outwardly by the indicator to a normal position beyond the plane of the gauging face of the stop member 61. Upon application of a work piece to the gauging element, and movement thereof to engagement with the stop plug 61, the member 66 is engaged and is moved an amount sufficient to afford an indicated positioning on the dial of the indicator 63. Rotation of the work piece when so held will cause an indication of any deviation from true squareness.

The gauging device of the character under consideration is applicable for measuring an out of round condition, and attention is here directed more particularly to Figs. 7 and 8 which show the gauge housing upon which is mounted a gauging element that is adapted to measure such a condition. As shown, the gauging element 20' here under consideration comprises a gauging sleeve 70 having an annular flange 71 adjacent an end thereof beyond which extends a sleeve-like portion 33' that is receivable within the housing opening 27 in the manner described above. The gauging element 20' has an end closure plug 39' which serves to retain a bar 72 within the axial passage of the sleeve 70. The bar 72 has an axial sensitivity determining groove 73 that defines a flow passage between the connection 19 and a radial passage 74 extending through the sleeve 70 and terminating at the surface thereof within a sector 75 of the sleeve surface of slightly reduced diameter.

The lateral limits of the sector of reduced diameter are defined by angularly spaced parallel axially extending projecting members 77 which extend outwardly a short distance beyond the normal diameter of the sleeve 70. The general arrangement of the several parts just described are illustrated in Fig. 8 in greatly exaggerated form; the diameter difference between the depressed portion 75 and the limiting ribs 77 being of the order of 0.0005 (five ten-thousandths) of an inch thus affording a very narrow gap which functions as a leakage path upon application of a work piece to the gauging element.

Proper positioning of a work piece on the gauging element is assured by provision of a yielding member 79 which is shown positioned diametrically opposed to the gauging portion 75, and which functions to urge an engaging work piece into contact with the ribs 77. As shown, the lower part of the gauging element is slotted as indicated at 80. Within the slot are oppositely facing grooves 81. The yielding member 79 is slidably received within the slot 80 and adjacent its inner end has outwardly extending ribs 82 that extend into the notches 81 and limit travel of the yielding member to a proper operating travel. As shown, the ribs 82 are of less width than the notches so that some radial movement of the member 79 may occur. The member 79 is forced outwardly through provision of springs 84 and is held against axial displacement through provision of a dowel pin 85 that threadedly engages the part 79 and has a tongue 86 extending into a socket 87 within the gauging sleeve 70. The proportioning of the slots 81 and interfitting ribs 82 is such that the member 79 will have a range of travel sufficient to properly hold a work piece against the extending ribs 77 so that leakage may obtain only lengthwise of the gauging element and may escape only at the ends thereof. Any eccentricity in the contour of a work piece undergoing tests will be instantly pointed out upon rotation of the work piece while in interfitting engagement on the gauging element because such a change from true circular contour will result in a change in the size of the gap between the work piece and the gauging element and will produce a change in the indicated pressure.

It is again pointed out that the depth of the reduced portion 75 is of the order of 0.0005 of an inch in order that it will be clearly apparent that the area of flow passage 74 is adequate to provide a sufficient air flow into this space. It is thought that it will be clearly apparent that upon adjusting the device with a standard test piece of predetermined and known diameter any deviation in subsequently tested work pieces will be made known by deviation of the gauges from the established positioning. Rotation of a work piece on the gauging element brings all portions of the work piece surface within the gauging range so that any deviation from an out of round condition will be indicated.

Figure 10:
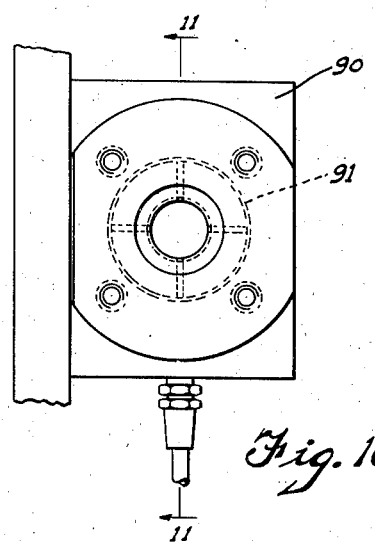
Fig. 10 is an elevational view showing a further modification of the gauging device.
Figure 11:
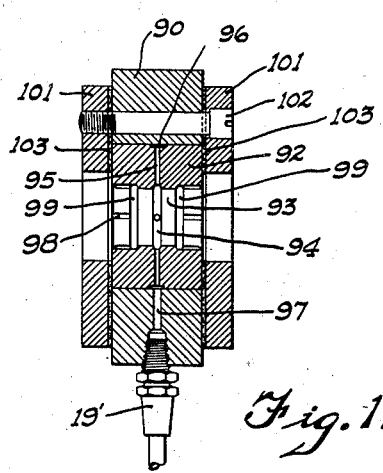
Fig. 11 is a sectional view as indicated by the line 11—11 on Fig. 10.

The arrangement of this gauging device may be also utilized for measuring cylindrical plugs and attention is now more particularly directed to Figs. 10 and 11 which illustrate a relationship of parts for accomplishing such gauging operations. As shown, the arrangement of parts here comprises a block 90 having a cylindrical bore 91 slidably receiving a sleeve-like member 92 that fits snugly within the cylindrical bore 91 and has a cylindrical opening 93 therethrough which functions as the gauging surface that cooperates with a telescopically interfitted work piece. The inner face of the gauging member 92 has an annular groove 94 from which radially extending passages 95 communicate with an annular groove 96 on the outer face thereof.

Fluid flow is obtained through a passage 97 in the member 90 extending exteriorly to a fitting 19' connectable with gauging and control devices as described above and terminating at the opposite end for registration with the annular groove 96 of an assembled gauging member. The gauging surfaces on the member 92 are defined by axially spaced annular grooves 99 equally spaced on opposite sides of the groove 94 communicating with the air supply line. Axial grooves 98 extend oppositely from the annular grooves 99 for free escape of leakage air.

The gauging member 92 is preferably of the same axial length as the enclosing part 90, and is held in assembled position therewith through provision of end rings 101 that are clamped across the opposite faces of the member 90 as by provision of clamping screws 102; suitable sealing gaskets 103 being provided. A plurality of the members 92 may be provided having work receiving openings of different size, and having flow communicating passages of different proportions.

The block 90 may be attached to the housing part 24 through provision on the housing part of a receiving boss 105 having suitable means for connection, in which event the gauging structure just described becomes an integral portion of the housing 22.

The character of the gauging device here under consideration is such that it permits rapid and accurate gauging within a wide operating range as regards the character of gauging to be accomplished or the degree of accuracy desired. That is, as explained above, the sensitivity of the gauging device may be readily altered so that the gauge is equally applicable for use on operations necessitating very closely held tolerance limits, or on gauging operations wherein the permissible variation is of material amount. Also, the nature of the gauging device is such that several gauging operations may be combined so that in effect different measurements are made concomitantly. For example, when measuring tubular members of material length the diameter variation may be observed at the same time that a test is made for straightness and, upon completion of the engaging stroke during which deviations in diameter or axial straightness are determined the work piece may then be gauged for squareness of ends without removal from the gauging element by the use of the indicating device illustrated in Fig. 9.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gauging element of the character described having a fluid passage therein, said element comprising a sleeve like member having a gauging surface thereon and a fluid escape opening extending from the gauging surface to the interior bore thereof, a bar removably receivable in the sleeve and having a groove therein adapted in assembly for registration with the sleeve opening, the sleeve cooperating with the groove of the bar to define the fluid passage, and means on the element attachable to a source of fluid pressure and providing communication through the fluid passage to the fluid escape opening.

2. A gauging element of the character described for attachment to a source of fluid pressure and adapted to receive a work piece in interfitting engagement, said element comprising a member having a fluid passage therethrough terminating in an annular groove on the surface thereof, said member having additional annular grooves axially spaced on opposite sides of the first mentioned annular groove and defining a gauging surface therebetween of predetermined size for cooperation with an interfitted work piece for determination of the size of the work piece in terms of fluid leakage therebetween, said member having axially extending surface grooves extending oppositely from the remotely positioned annular grooves for free escape of fluid therethrough.

3. A gauging element of the character described for attachment to a source of fluid pressure to measure an out of round condition in a cylindrical opening of a work piece comprising a gauging member having an arcuate gauging portion limited in lateral extent by parallel axially extending ribs projecting beyond the surface of the arcuate portion, said member having a fluid passage therein terminating at the periphery of the member within the arcuate portion and intermediate the said ribs, said member being adapted to receive a work piece in telescopic interfitting engagement for determination of an out of round condition in terms of fluid leakage between the work piece and the arcuate surface.

4. A gauging element of the character described for attachment to a source of fluid pressure comprising a gauging member having an arcuate gauging portion laterally limited by parallel axially extending ribs projecting above the arcuate surface and having communication with said pressure source, work engaging means on the opposite side of said member yieldingly urged outwardly and adapted to hold a telescopically interfitted work piece in engagement with said ribs for determination of an out of round condition in the work piece in terms of fluid leakage intermediate the arcuate surface and the work piece.

LOUIS F. POOCK.
WILLIS FAY ALLER.